(12) United States Patent
Kakihara

(10) Patent No.: US 9,000,700 B2
(45) Date of Patent: Apr. 7, 2015

(54) MOTOR CONTROL APPARATUS

(71) Applicant: Denso Corporation, Kariya, Aichi-pref. (JP)

(72) Inventor: Takayuki Kakihara, Okazaki (JP)

(73) Assignee: Denso Corporation, Kariya (JP)

( * ) Notice: Subject to any disclaimer, the term of this patent is extended or adjusted under 35 U.S.C. 154(b) by 142 days.

(21) Appl. No.: 13/729,472

(22) Filed: Dec. 28, 2012

(65) Prior Publication Data

US 2013/0169205 A1    Jul. 4, 2013

(30) Foreign Application Priority Data

Dec. 28, 2011   (JP) .................................. 2011-287438

(51) Int. Cl.
| | |
|---|---|
| H02P 6/00 | (2006.01) |
| B60W 10/06 | (2006.01) |
| B60W 10/08 | (2006.01) |
| B60W 20/00 | (2006.01) |
| F02N 11/04 | (2006.01) |
| H02P 29/02 | (2006.01) |
| B60K 6/26 | (2007.10) |
| F02D 29/06 | (2006.01) |
| F02D 41/22 | (2006.01) |
| F02N 11/08 | (2006.01) |

(52) U.S. Cl.
CPC ............... *H02P 6/001* (2013.01); *B60W 10/06* (2013.01); *B60W 10/08* (2013.01); *B60W 20/00* (2013.01); *B60W 20/50* (2013.01); *F02N 11/04* (2013.01); *H02P 29/022* (2013.01); *H02P 29/023* (2013.01); *B60K 2006/268* (2013.01); *Y02T 10/6286* (2013.01); *F02D 29/06* (2013.01); *F02D 2041/227* (2013.01); *F02D 2250/26* (2013.01); *F02N 2011/0888* (2013.01); *F02N 2011/0896* (2013.01)

(58) Field of Classification Search
CPC ..................................................... H02P 29/022
USPC .................... 318/400.22, 400.21, 400.01, 700
See application file for complete search history.

(56) References Cited

U.S. PATENT DOCUMENTS

| | | | | |
|---|---|---|---|---|
| 5,048,485 A | * | 9/1991 | Terazawa et al. ............. | 123/399 |
| 5,381,769 A | * | 1/1995 | Nishigaki et al. ............. | 123/399 |
| 6,135,085 A | * | 10/2000 | Toyohara et al. ............. | 123/306 |

(Continued)

FOREIGN PATENT DOCUMENTS

| | | |
|---|---|---|
| JP | 4-207994 | 7/1992 |
| JP | 6-100123 | 12/1994 |

(Continued)

OTHER PUBLICATIONS

Office Action (2 pages) dated Dec. 24, 2014, issued in corresponding Japanese Application No. 2011-287438 and English translation (3 pages).

*Primary Examiner* — David S Luo
(74) *Attorney, Agent, or Firm* — Nixon & Vanderhye P.C.

(57) ABSTRACT

A MG-ECU is provided in a hybrid vehicle having an MG and an engine and starts the engine by controlling the MG. When the MG-ECU detects a disconnection in any one of three-phase power supply wires, which supply the MG with power, the MG-ECU permits driving of the MG on condition that the engine is requested to be started. The MG-ECU limits a command torque for the MG is limited to be equal to or less than a predetermined torque value than in a case of presence of no disconnection, when the MG is permitted to be driven.

9 Claims, 2 Drawing Sheets

(56) References Cited

U.S. PATENT DOCUMENTS

| | | | |
|---|---|---|---|
| 6,329,772 B1 | 12/2001 | Ochiai et al. | |
| 6,359,405 B1 | 3/2002 | Tsurumi | |
| 7,215,518 B2 * | 5/2007 | Matsumoto et al. | 361/23 |
| 7,759,888 B2 | 7/2010 | Matsui et al. | |
| 7,940,018 B2 * | 5/2011 | Yonemori et al. | 318/376 |
| 2003/0058589 A1 | 3/2003 | Matsumoto et al. | |
| 2009/0323232 A1 | 12/2009 | Suzuki et al. | |

FOREIGN PATENT DOCUMENTS

| | | |
|---|---|---|
| JP | 2006-105016 | 4/2006 |
| JP | 2009-280036 | 12/2009 |
| JP | 2010-124588 | 6/2010 |
| JP | 2010-167881 | 8/2010 |
| JP | 2011-157857 | 8/2011 |

* cited by examiner

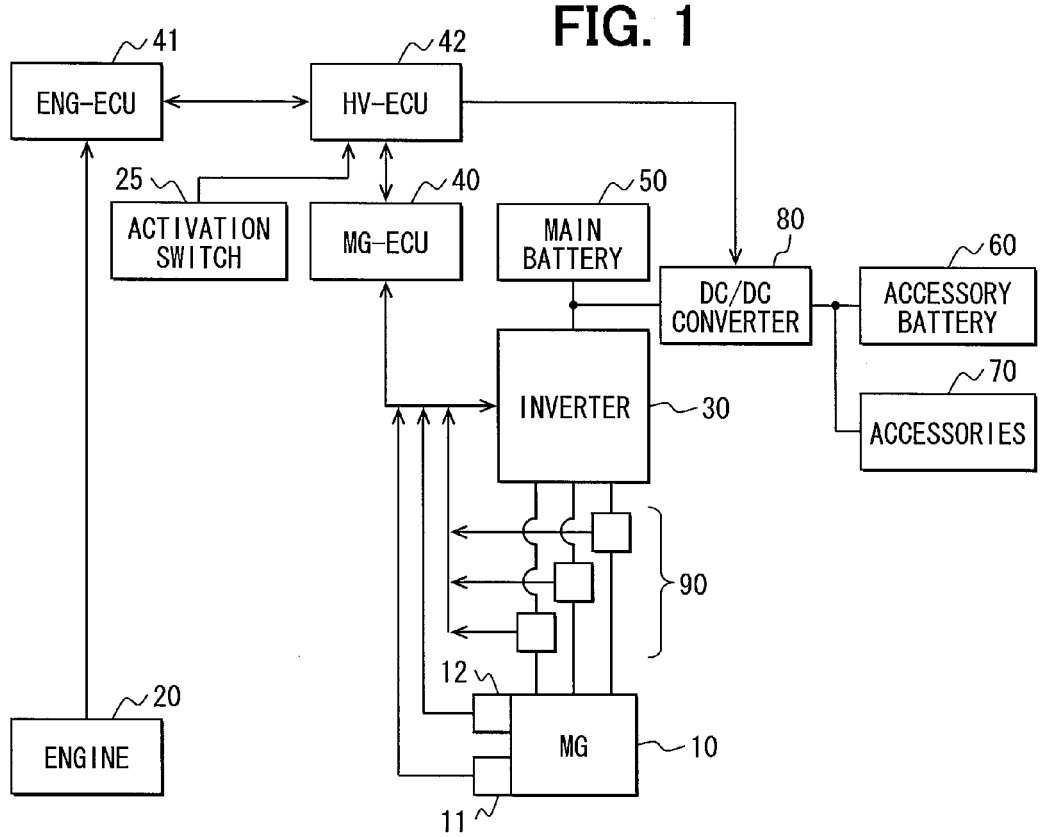
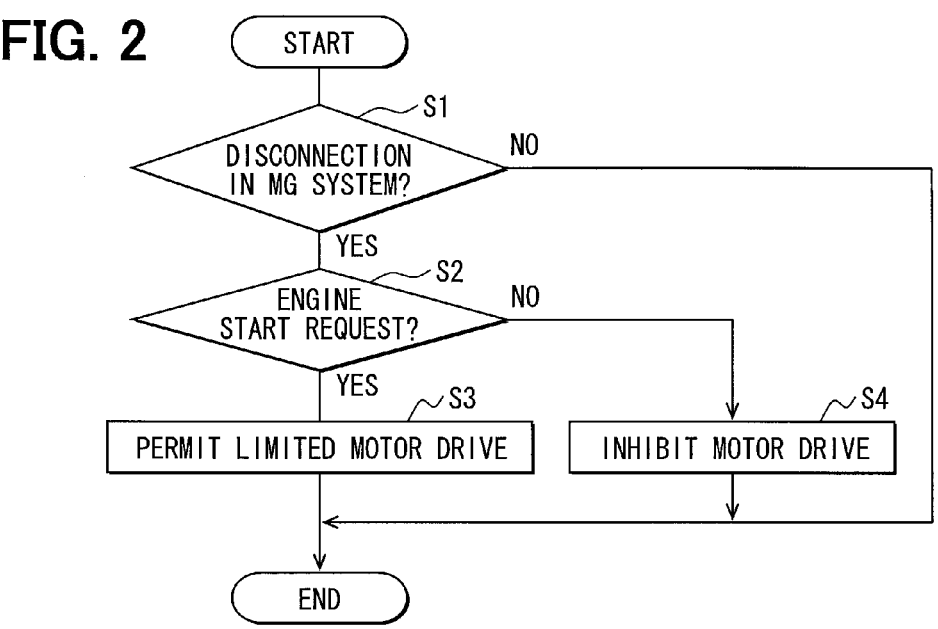

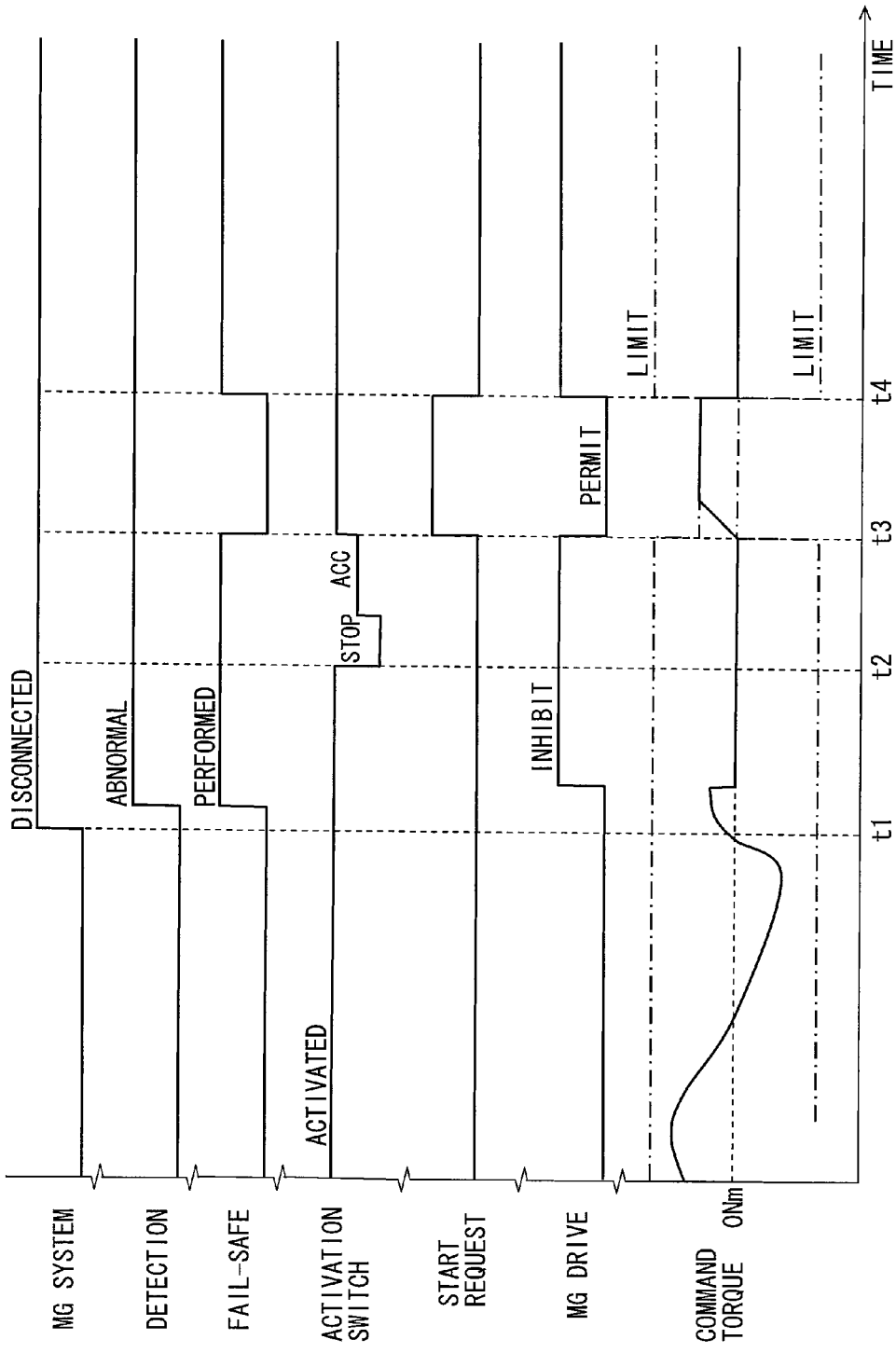

MOTOR CONTROL APPARATUS

CROSS REFERENCE TO RELATED APPLICATION

This application is based on and incorporates herein by reference Japanese patent application No. 2011-287438 filed on Dec. 28, 2011.

TECHNICAL FIELD

The present disclosure relates to a motor control apparatus, which is implemented in a hybrid vehicle having a three-phase motor for starting an internal combustion engine.

BACKGROUND ART

A hybrid vehicle travels by drive force of one of a three-phase motor-generator (three-phase motor). The three-phase motor is controlled by a motor control apparatus in accordance with a vehicle operation condition. When a disconnection arises in three-phase power supply wires, which supply power to the three-phase motor, the motor control apparatus determines that the three-phase motor has an abnormality. The motor control apparatus interrupts a power conversion device connected to the three-phase motor thereby to prohibit the control operation of the three-phase motor (for example, JP 2001-69607A corresponding to U.S. Pat. No. 6,329,772).

In some hybrid vehicles, a three-phase motor is used to start an internal combustion engine. Specifically, when the internal combustion engine is started manually by operating a start key or automatically from an idle-stop condition, the three-phase motor is driven to start the internal combustion engine. In such a vehicle, when the internal combustion engine is stopped upon occurrence of a disconnection in three-phase power supply wires provided to supply electric power to the three-phase motor, the three-phase motor cannot be driven again even if a restarting of the internal combustion engine is tried. Thus the internal combustion engine cannot be started.

However, when the disconnection arises in the three-phase power supply wires, which supply power to the three-phase motor, a warning light is activated to indicate a malfunction. As a result, it is likely that the internal combustion engine will be stopped manually by a driver or automatically by the idle-stop operation. In such a case it is also likely that the internal combustion engine will be needed to be restarted.

SUMMARY

It is therefore an object to provide a motor control apparatus, which is capable of restarting an internal combustion engine even when a disconnection arises in one of three-phase power supply wires for supplying electric power to a three-phase motor.

According to one aspect, a motor control apparatus is provided for a hybrid vehicle provided with a three-phase motor and an internal combustion engine. The motor control apparatus starts the internal combustion engine by controlling the three-phase motor. The motor control apparatus comprises a disconnection check part, a start request check part and a motor driving permission part. The disconnection check part checks whether a disconnection is present in any one of three-phase power supply wires of the three-phase motor. The start request check part checks whether an engine start request for starting the internal combustion engine by the three-phase motor is present. The motor driving permission part permits driving of the three-phase motor on condition that the disconnection is detected by the disconnection check part and the engine start request is detected by the start request check part.

BRIEF DESCRIPTION OF THE DRAWINGS

The above and other objects, features and advantages of a motor control apparatus will become more apparent from the following detailed description made with reference to the accompanying drawings. In the drawings:

FIG. 1 is a schematic diagram showing a general configuration of a vehicle system including a motor control apparatus according to an embodiment;

FIG. 2 is a flowchart showing processing of a three-phase motor drive control by the motor control apparatus; and FIG. 3 is a time chart showing an operation of the three-phase motor drive control.

DETAILED DESCRIPTION OF THE EMBODIMENT

A motor control apparatus will be described below with reference to one embodiment shown in the accompanying drawings. The motor control apparatus is implemented in a parallel-type hybrid vehicle in the embodiment. A general configuration of a vehicle system will be described first with reference to FIG. 1.

As shown in the figure, a motor-generator (MG) 10 and an internal combustion engine (engine) 20 are mounted in a vehicle to provide drive force for vehicle travel. The MG 10 is a three-phase permanent-magnet type synchronous motor (three-phase motor) and has a function (force drive function) of a motor, which is driven by electric power, and has a function (regeneration function) of a generator, which converts mechanical energy to electric energy at deceleration of the vehicle. This drive force of the MG 10 is used as a drive power source for starting the engine 20 and a drive power source for traveling of the vehicle.

The vehicle has a main battery 50 having a high terminal voltage (for example, higher than several hundreds of volts), an accessory battery 60 having a low terminal voltage (for example, 12 volts), an inverter (power conversion device) 30, accessory devices 70, and a DC/DC converter 80.

The main battery 50 may be, for example, a lithium-ion storage battery or a nickel-hydride storage battery. The accessory battery 60 may be a lead storage battery, the energy output density of which is less than that of the main battery 50. The main battery 50 supplies electric power to the MG 10 through the inverter 30. The inverter 30 has three sets of series-connected switching elements (for example, IGBTs). The junctions of the series-connected switching elements are connected to U-phase, V-phase and W-phase of the MG 10.

The accessory battery 60 supplies electric power to the accessory devices 70 such as various electronic control units (ECUs), headlights and an air-conditioner. The discharge power of the accessory battery 60 is also supplied to the MG 10 after being boosted or stepped up by the DC/DC converter 80 and inputted to the inverter 30. Three-phase AC power generated by the MG 10 is charged into the main battery 50 after being rectified by the inverter 30 and also charged into the accessory battery 60 after being stepped down by the DC/DC converter 80.

The vehicle system includes an activation switch 25, current sensors 90, a rotation angle sensor 11 and a temperature sensor 12 as means for detecting conditions of the engine 20, the MG 10 and the inverter 30. The activation switch 25 is manually switchable to a stop position (OFF position), a preparation position (accessory position) and an activation position (ON and start position) by a driver. The condition of the activation switch 25 is retrieved by a hybrid control apparatus (HV-ECU) 42 through an interface, which is not shown. The current sensors 90 detect three-phase currents Iu, Iv and Iw, which flow in respective phases of the MG 10. The rotation angle sensor 11 detects a rotation angle θ (electric angle) of the MG 10. The temperature sensor 12 detects a temperature of the permanent magnets provided in the MG 10. Detection signals of these sensors are retrieved by a motor control apparatus (MG-ECU) 40. Detection values of the currents and the rotation angle are transmitted to a torque calculation part (torque calculation means) provided in the MG-ECU 40. The torque calculation part calculates a rotation speed ω of the MG 10 based on the rotation angle θ and further calculates an output torque of the MG 10 based on the detection values of the rotation speed ω as well as the currents Iu, Iv, Iw.

The vehicle system includes various electronic control units (ECUs) such as the HV-ECU 42, the ENG-ECU 41 and the MG-ECU 40. Each of these ECUs is generally formed of a microcomputer including a CPU, a ROM, a RAM and the like. The CPU executes various control processing defined as control programs stored in the ROM. The HV-ECU 42 is capable of bilateral communications with each of the ENG-ECU 41 and the MG-ECU 40.

The HV-ECU 42 is a higher ECU than the ENG-ECU 41 and the MG-ECU 40. That is, the HV-ECU 42 is an upstream side when viewed from a user request inputted from a user interface such as an accelerator pedal. The HV-ECU 42 calculates command values for the engine 20 and the MG 10 based on detection signals of driver's operation amount of the accelerator pedal or the like.

The HV-ECU 42 further controls the operation of the DC/DC converter 80 based on a SOC (state of charge, which indicates a ratio of actual charge amount relative to full charge amount) of the accessory battery 60, a SOC of the main battery 50 and the like so that the amount of step-up and step-down of the voltage of the DC/DC converter 80 attains the desired value.

The ENG-ECU 41 is a control apparatus, which drives various actuators required for combustion control of the engine 20. When the ENG-ECU 41 receives a command value corresponding to a travel condition from the HV-ECU 42, it performs combustion control of the engine 20 such as fuel injection control by fuel injection valves to attain the command value.

The MG-ECU 40 is a control apparatus, which controls power supply of the switching elements in the inverter 30. When the MG-ECU 40 receives the engine start request, it turns on the switching elements in the inverter 30 to cause the three-phase motor 10 to generate a drive force required to start the engine 20. It thus applies initial rotation to a crankshaft of the engine 20 to start the engine 20. When the MG-ECU 40 receives the torque command value corresponding to the travel condition from the HV-ECU 42, it controls power supply of the switching elements in the inverter 30 to attain the command value. When the MG-ECU 40 receives the command torque from the HV-ECU 42, it determines a command current value based on a deviation from the calculated torque. It then calculates a command voltage value from the command current value to turn on the inverter 30, and applies to the inverter 30 a pulse signal having a pulse width corresponding to the command voltage value.

A sequence of processing of MG drive control by the MG-ECU 40 will be described next with reference to FIG. 2. This sequence of processing is executed repetitively at every predetermined interval.

It is first checked whether a disconnection is present in any one of the three-phase power supply wires (S1), which supply power to the MG 10. The disconnection may be detected by any one of conventional wire disconnection detection methods. If it is determined that no disconnection is present in any one of the three-phase power supply wires (S1:NO), this sequence of processing is finished once (END).

If it is determined that the disconnection is present in one of the three-phase power supply wires (S1:YES), on the other hand, it is further checked whether a start request for the engine 20 is received from the activation switch 25 through the HV-ECU 42. Specifically, when the activation switch 25 is switched over to the activation position by the driver, the start request is continuously outputted from the HV-ECU 42 to the MG-ECU 40 for a predetermined time period from the activation of the activation switch 25. If it is determined that no start request for the engine 20 is issued (S2:NO), driving the MG 10 is inhibited (S4). That is, the switching elements in the inverter 30 are all turned off thereby to disconnect electrically the inverter 30 and the main battery 50. Then this sequence of processing is finished once (END).

If it is determined that the start request for the engine 20 is received from the HV-ECU 42 (S2:YES), driving the MG 10 is permitted (S3) although it is more limited than when no disconnection is present in the MG 10. The drive force required to start the engine 20 is less than that required for a vehicle to travel. For this reason, the MG 10 is permitted to be driven while being limited in power generation. By permitting driving of the MG 10 with limitation, the current supplied to the MG 10 and the inverter 30 is suppressed from becoming excessive and hence protected from being damaged. The driving of the MG 10 may be limited by at least one of the following processing.

(1) When driving the MG 10 is permitted, the rotation speed of the MG 10 is limited to be equal to or less than a predetermined speed value. The rotation speed of the MG 10 is controlled by a voltage applied to the inverter 30. When the command voltage value applied to the inverter 30 is limited so that the rotation speed of the MG 10 becomes less than the predetermined speed value, the current values of the MG 10 and the inverter 30 are also limited. Thus the excessive current is prevented from flowing to the MG 10 and the inverter 30 so that the MG 10 and the inverter 30 can be protected from being damaged. Assuming that a minimum rotation speed, which enables starting of the engine 30, is the predetermined speed value, the current supplied to the MG 10 and the inverter 30 can be minimized preferably.

(2) When driving the MG 10 is permitted, the command torque to the MG 10 is limited to be equal to or less than a predetermined torque value. The torque of the MG 10 is regulated by the current, which flows to the MG 10, and the current increases as the command torque increases. If the command torque for the MG 10 is limited to be equal to or less than the predetermined torque value, the required current is also limited. Thus, the excessive current is prevented from flowing to the MG 10 and the inverter 30, so that the MG 10 and the inverter 30 can be protected from being damaged. If the minimum torque value, which enables the starting of the engine 20, is the predetermined torque value, the current supplied to the MG 10 and the inverter 30 can be minimized preferably.

(3) When driving the MG 10 is permitted, the output torque of the MG 10 is limited to be equal to or less than a predetermined output torque value. When a disconnection arises, the MG 10 is controlled unstably. Even if the command torque is limited to be equal to or less than the predetermined torque value, the output torque sometimes exceeds the predetermined torque value. For this reason, feedback control is performed to reduce the calculated output torque to be equal to or less than the predetermined output torque value and surely suppress the excessive current from flowing to the MG 10 and the inverter 30. If the minimum torque value, which enables the starting of the engine 20, is the predetermined output torque value, the current supplied to the MG 10 and the inverter 30 can be minimized preferably.

(4) When driving the MG 10 is permitted, the current supplied to the MG 10 is limited to be equal to or less than a predetermined current value. By controlling the power supply to the inverter 30 thereby to limit the current supplied to the MG 10 to be equal to or less than the predetermined current value, the excessive current is prevented from flowing to the MG 10 and the inverter 30. For this reason, the MG 10 and the inverter 30 can be protected from being damaged. If the minimum current value, which enables the starting of the engine 20, is the predetermined current value, the current supplied to the MG 10 and the inverter 30 can be minimized preferably.

(5) When driving the MG 10 is permitted, the time period of driving the MG 10 is limited to be equal to or less than a predetermined time period. That is, by controlling the time period of power supply to the inverter 30 to be equal to or less than the predetermined time period, the power supply time period can be suppressed even if the excessive current flows to the MG 10 and the inverter 30. As a result, the MG 10 and the inverter 30 can be protected from being damaged. If the minimum drive time period, which enables the starting of the engine 20, is the predetermined time period value, the time period of flow of the excessive current to the MG 10 and the inverter 30 can be minimized preferably.

(6) When driving the MG 10 is permitted, the temperature of the MG 10 is limited to be equal to or less than a predetermined temperature value. The temperature of the MG 10 varies with the current supplied to the MG 10 and a time period of the current flow to the MG 10. By controlling the power supply to the inverter 30 so that the temperature of the MG 10 detected by the temperature sensor 12 becomes less than the predetermined temperature value, the excessive current can be suppressed from flowing to the MG 10 and the inverter 30 for a long time period. The MG 10 and the inverter 30 can be protected from being damaged. In addition, the permanent magnets provided in the MG 10 are protected from losing the magnetic force thereof even if the temperature rises.

The MG 10 is permitted to be driven with limitation by executing any one of the above-described processing (1) to (6). It is of course possible to combine two or more processing. The above-described sequence of processing is finished once (END) after permitting driving of the MG 10 by limiting the driving of the MG 10 than in a case, in which no disconnection is present in the MG 10.

Steps S1, S2, S3 and S4 operate as a disconnection check part, a start request check part, a motor driving permission part and a motor driving inhibition part, respectively.

The above-described processing (2) executed at step S3 in FIG. 2 will be described next with reference to FIG. 3. As shown in the figure, it is assumed that any one of the three-phase power supply wires, which supplies power to the MG 10, is disconnected at time t1 while the vehicle is traveling with the MG 10 operating normally. The MG-ECU 40 detects this disconnection and performs a fail-safe operation to inhibit driving of the MG 10. The command torque for the MG 10 becomes 0 Nm. At this time, the vehicle travels by using only the drive force of the engine 20 but a warning light is lit in a vehicle compartment to indicate an abnormality. At time t2, the driver stops the vehicle in response to the indication of malfunction provided by the warning light. Specifically, the driver switches over the activation switch 25 to the stop position to stop the engine 20. The MG-ECU 40 performs the fail-safe operation and continues to inhibit driving of the MG 10. At time t3, the driver switches over the activation switch 25 to the activation position again to move the vehicle, the HV-ECU 42 outputs the engine start request to the MG-ECU 40 during a predetermined time period from the switch activation. The MG-ECU 40 stops the fail-safe operation upon reception of the start request for starting the engine 20. The MG-ECU 40 performs starting the engine 20 by permitting the driving of the MG 10 while limiting the command torque for the MG 10 to be equal to or less than the predetermined torque value.

At time t4 and thereafter, when the rotation speed of the engine 20 reaches a start check rotation speed, the ENG-ECU 41 determines that starting the engine 20 is completed. Then the HV-ECU 42 stops outputting to the MG-ECU 40 the start request for the engine 20. The MG-ECU 40 performs the fail-safe operation again and stops driving the MG 10. Thus, the command torque for the MG 10 is 0 Nm.

As a result, even when a disconnection arises in any one of the three-phase power supply wires for supplying power to the MG 10, the engine 20 can be started by driving the MG 10 at time t3. When no request for starting the engine 20 is generated, driving the MG 10 is not permitted. Thus, the MG 10 and the inverter 30 can be protected from damages, which will otherwise be caused when the MG 10 is continuously driven even after an occurrence of disconnection.

The motor control apparatus is not limited to the above-described embodiment.

For example, when the activation switch 25 is at the activation position and the engine 20 is automatically being stopped, the start request is outputted from the HV-ECU 42 to the MG-ECU 40 in response to the automatic start request for the engine 20. In this case, it is possible to permit driving the MG 10 even if any one of the three-phase power supply wires of the MG 10 is disconnected.

It is also possible to permit driving the MG 10 on condition that not only the automatic start request for the engine 20 is generated but also the activation switch 25 is operated by the driver, when any one of the three-phase power supply wires of the MG 10 is disconnected. According to this configuration, the MG 10 is permitted to be driven only when the driver intentionally requests starting the engine 20. Use of the MG 10 having an abnormality of disconnection can thus be reduced to a requisite minimum.

What is claimed is:

1. A motor control apparatus for a hybrid vehicle provided with a three-phase motor and an internal combustion engine, the motor control apparatus starting the internal combustion engine by controlling the three-phase motor, the motor control apparatus comprising:
    a disconnection check part for checking whether a disconnection is present in any one of three-phase power supply wires of the three-phase motor;
    a start request check part for checking whether an engine start request for starting the internal combustion engine by the three-phase motor is present;
    a motor driving inhibition part for inhibiting driving of the three-phase motor as a drive power source for travel of the hybrid vehicle when the disconnection is detected by the disconnection check part; and
    a motor driving permission part for permitting, under a state that the disconnection is detected by the disconnection check part, driving of the three-phase motor from when the engine start request is detected by the start request check part until when starting the internal combustion engine is completed.

2. A motor control apparatus for a hybrid vehicle with a three-phase motor and an internal combustion engine, the motor control apparatus starting the internal combustion engine by controlling the three-phase motor, the motor control apparatus comprising:
a disconnection check part for checking whether a disconnection is present in any one of three-phase power supply wires of the three-phase motor;
a start request check part for checking whether an engine start request for starting the internal combustion engine by the three-phase motor is present; and
a motor driving permission part for permitting driving of the three-phase motor on condition that the disconnection is detected by the disconnection check part and the engine start request is detected by the start request check part;
wherein: the motor driving permission part drives the three-phase motor with more limitation than in a case of no detection of the disconnection, when the driving of the three-phase motor is permitted.

3. The motor drive control apparatus according to claim 2, the motor driving permission part limits a rotation speed of the three-phase motor to be equal to or less than a predetermined speed value, when the driving of the three-phase motor is permitted.

4. The motor drive control apparatus according to claim 2, the motor driving permission part limits a command torque for the three-phase motor to be equal to or less than a predetermined command torque value, when the driving of the three-phase motor is permitted.

5. The motor drive control apparatus according to claim 2, wherein: the motor driving permission part limits an output torque value of the three-phase motor to be equal to or less than a predetermined output torque value, when the driving of the three-phase motor is permitted.

6. The motor drive control apparatus according to claim 2, wherein: the motor driving permission part limits a current supplied to the three-phase motor to be equal to or less than a predetermined current value, when the driving of the three-phase motor is permitted.

7. The motor drive control apparatus according to claim 2, wherein: the motor driving permission part limits a time period of driving the three-phase motor to be equal to or less than a predetermined time period, when the driving of the three-phase motor is permitted.

8. The motor drive control apparatus according to claim 2, wherein: the motor driving permission part limits a temperature of the three-phase motor to be equal to or less than a predetermined temperature value, when the driving of the three-phase motor is permitted.

9. A motor control apparatus for a hybrid vehicle provided with a three-phase motor and an internal combustion engine, the motor control apparatus starting the internal combustion engine by controlling the three-phase motor, the motor control apparatus comprising:
a disconnection check part for checking whether a disconnection is present in any one of three-phase power supply wires of the three-phase motor;
a start request check part for checking whether an engine start request for starting the internal combustion engine the three-phase motor is present; and
motor driving permission part for permitting driving of the three-phase motor on condition that the disconnection is detected by the disconnection check part and the engine start request is detected by the start request check part;
wherein: the vehicle is provided with an activation switch, which is manually operable to supply the power to the three-phase motor; and the motor driving permission part permits the driving of the three-phase motor when the start request check part detects that the activation switch is operated.

* * * * *